United States Patent Office 3,008,905
Patented Nov. 14, 1961

---

3,008,905
FOAM PRODUCING COMPOSITION
Hans Wedell, Dusseldorf, Germany, assignor to Bohme Fettchemie G.m.b.H., Dusseldorf, Germany, a corporation of Germany
No Drawing. Filed Dec. 4, 1957, Ser. No. 700,571
Claims priority, application Germany Dec. 5, 1956
8 Claims. (Cl. 252—307)

This invention relates to new and improved foam improving agents. The invention more particularly relates to foam improving agents which will improve the foaming characteristics of alkylene oxide addition products.

Addition products produced by the addition of 1 to 4 mols of an alkylene oxide, as for example, ethylene oxide or propylene oxide to an organic compound which contains replaceable hydrogen atoms and which has at most 12 carbon atoms in the molecule are well known.

The organic compounds which are used to produce these addition products have a hydrocarbon radical with at most 12 carbon atoms in the molecule which may possibly be interrupted by heteroatoms or groups of heteroatoms or which may contain substituents such as alcohols, phenols, mercaptans, amines, carboxylic acids, carboxyl amides, sulfonyl amides, carboxyl alkylolamides and the like.

The alkylene oxide addition products are generally used in the form of aqueous solutions or dispersions, and may, for example, constitute components of washing agents of all types, as for example, alkali phosphates, silicates, carbonates, methyl cellulose, carboxylmethylcellulose, anion or cation active compounds, inorganic fillers, or the like, such as are used in household or industrial detergents and in dish-washing agents.

The alkylene oxide addition products have, however, poor foaming characteristics and do not form a high or stable foam which is desirable for many purposes.

One object of this invention is to increase the foaming characteristics of these alkylene oxide addition compounds. This, and still further objects will become apparent from the following description:

In accordance with the invention, it has been surprisingly discovered that the foaming characteristics of the alkylene oxide addition products are substantially increased with respect to the height of foam, the stability of the foam and the ability of the foam to absorb water, by the addition of 0.5 to 30% and preferably 2 to 10% by weight, referred to the dry alkylene oxide addition product of a high molecular carboxylic acid and preferably a fatty acid or their difficultly soluble metal salts.

The fatty acids or fatty acid salts may be added to the dry mixture containing the alkylene oxide addition compounds or may be added to the aqueous solutions or dispersions after formation thereof.

Suitable fatty acids which may be used, in accordance with the invention, include fatty acids containing at least 8 carbon atoms in the molecule which may be of a saturated or unsaturated nature, such as capric acid, lauric acid, myristic acid, palmitic acid, stearic acid, oleic acid, and the like, as well as mixtures of these acids, which occur, for example, in animal or vegetable fatty acid mixtures such as tallow fatty acids, coconut oil fatty acids or else in the higher molecular carboxylic acids obtained by paraffin oxidation. In addition, there may be used high molecular branched aliphatic carboxylic acids including those which bear substituents, as for example, hydroxyl groups. There furthermore enter into consideration other higher molecular carboxylic acids such as naphthenic acid or the like. In place of the carboxylic acids per se, and particularly the fatty acids, there may also be used to particular advantage, as already mentioned, the difficultly soluble metal salts of these acids, as for example, their calcium, magnesium and aluminum salts. In this connection, it is not necessary for the salts to be used as such, but they may be formed in situ in the solution by reaction, as for example, by employing, in addition to fatty acids at the same time, stoichiometric or sub-stoichiometric quantities of water-soluble salts of the metal bases entering into question such as magnesium acetate, calcium formate, or the like.

As mentioned, the fatty acids or their salts are added to the alkylene oxide addition products or their solution in quantities of 0.5 to 30% and preferably 2 to 10% referred to the dry weight of the alkylene oxide addition products.

The alkylene oxide addition products may be any of the conventional and well known alkylene oxide products as mentioned above, i.e., addition products of 1 to 4 mols of an alkylene oxide, as for example, ethylene oxide or propylene oxide to an organic compound which contains a replaceable hydrogen atom and has at most 12 carbon atoms in the molecule. These materials will be generically referred to herein and in the claims as "alkylene oxide addition compounds."

The addition of the fatty acids or their salts is of advantage not only for the alkylene oxide addition products per se, but also to mixtures of these addition products with customary washing agents of all types, such as the alkali phosphates, silicates, carbonates, methyl cellulose, carboxylmethylcellulose, anion-active or cation active compounds, inorganic fillers, etc., such as are used in household or industrial detergents and in dish-washing agents. The aqueous solutions or dispersions of alkylene oxide addition products of the improved foaming action in accordance with the invention, can furthermore be used as flotation agents or as textile adjuvants.

Examples

In order to compare the foaming qualities of various alkylene oxide addition compounds per se, and those containing the high molecular carboxylic acids or salts, in accordance with the invention, a number of bath compositions were made up, and the foaming power of these bath compositions was determined by the customary foam determination method in accordance with the Journal "Seifon-Öle-Fette-Wachse," 1955, page 277.

| | Height of foam in cm. | |
|---|---|---|
| | after 60 sec. | after 120 sec. |
| I. Bath Composition: | | |
| 0.5 g./l. of the addition product of 2 mol ethylene oxide to 1 mol n-octylalcohol | 2.7 | 1.8 |
| 0.5 g./l. of the said addition product; 0.05 g./l. tallow fatty acid; 0.01 g./l. magnesium acetate | 17 | 15 |
| 0.5 g./l. of the said addition product; 0.1 g./l. capric acid | 14 | 12 |

| | after 10 sec. | after 30 sec. |
|---|---|---|
| II. Bath Composition: | | |
| 0.25 g./l. of the addition product of 3.9 mol ethylene oxide to 1 mol pentylphenol | 1.1 | 0.9 |
| 0.25 g./l. of the said addition product; 0.05 g./l. behenic acid; 0.05 g./l. aluminium formate | 5.4 | 2.1 |

| | after 60 sec. | after 120 sec. |
|---|---|---|
| III. Bath Composition: | | |
| 0.5 g./l. of the addition product of 2 mol ethylene oxide to 1 mol secondary nonyl alcohol | 0.8 | 0.5 |
| 0.5 g./l. of the said addition product; 0.05 g./l. stearic acid; 0.01 g./l. calcium acetate. The latter composition may be used as a flotation agent, while the same composition without addition of stearic acid is of no use for this purpose. | 18 | 15 |

| | Height of foam in cm. | |
|---|---|---|
| | after 10 sec. | after 30 sec. |
| IV. Bath Composition: | | |
| 1.0 g./l. of the addition product of 3.2 mol ethylene oxide to 1 mol capric acid | 3.4 | 2.4 |
| 1.0 g./l. of the said addition product; 0.1 g./l. tallow fatty acids; 0.02 g./l. zinc acetate | 24.1 | 6.3 |
| 0.5 g./l. of the said addition product | 4.5 | 2.3 |
| 0.5 g./l. of the said addition product; 0.1 g./l. lauric acid | 10.0 | 4.6 |

| | after 60 sec. | after 120 sec. |
|---|---|---|
| V. Bath composition: | | |
| 1.0 g./l. of the addition product of 4 mol ethylene oxide to 1 mol lauryl monoethanolamide | 6.9 | 6.5 |
| 1.0 g./l. of the said addition product; 0.2 g./l. lauric acid | 29 | 27 |
| 1.0 g./l. of the said addition product; 0.2 g./l. palmitic acid | 17 | 16 |
| 1.0 g./l. of the said addition product; 0.2 g./l. stearic acid | 17 | 15 |

| | after 30 sec. | after 120 sec. |
|---|---|---|
| VI. Bath composition: | | |
| 1.0 g./l. of the addition product of 2 mol ethylene oxide to 1 mol lauryl amide; 0.03 g./l. sodium lauryl sulfate | 8 | 7.5 |
| 1.0 g./l. of the said addition product; 0.03 g./l. sodium lauryl sulfate; 0.2 g./l. lauric acid | 29 | 26 |
| This composition may be used as a dish-washing or hair washing-agent on account of its improved foaming characteristic while the product without addition of lauric acid is less useful. | | |

I claim:

1. A composition suitable for producing foam in aqueous media, comprising an ethylene oxide addition compound produced by the addition of 1 to 4 mols of ethylene oxide to an organic compound which contains a replaceable hydrogen atom and has at most 12 carbon atoms in the molecule and from 0.5 to 30% by weight, referred to the dry weight of the ethylene oxide addition product, of a member selected from the group consisting of high-molecular weight carboxylic acids having from 8 to 22 carbon atoms in their molecule and metal salts thereof which are only difficultly soluble in water.

2. The composition of claim 1, containing from 2 to 10% by weight, referred to the dry weight of the ethylene oxide addition product, of said acid group member.

3. The composition of claim 2, wherein said group member is a calcium salt.

4. The composition of claim 2, wherein said group member is a magnesium salt.

5. The composition of claim 2, wherein said group member is an aluminum salt.

6. The composition of claim 2, wherein said group member is a zinc salt.

7. The composition of claim 2, wherein said acid group member contains from 10 to 20 carbon atoms in its molecule.

8. The composition of claim 2, wherein said organic compound is a member selected from the group consisting of alcohols, phenols, carboxylic acids and carboxylic amides.

References Cited in the file of this patent

UNITED STATES PATENTS

| 2,042,359 | Putt | May 26, 1936 |
| 2,088,085 | Gross et al. | July 27, 1937 |
| 2,529,211 | Busse et al. | Nov. 7, 1950 |
| 2,539,012 | Diamond et al. | Jan. 23, 1951 |
| 2,678,921 | Turck | May 18, 1954 |
| 2,748,078 | Perri et al. | May 29, 1956 |